United States Patent
Noh et al.

(10) Patent No.: US 11,620,954 B2
(45) Date of Patent: Apr. 4, 2023

(54) DISPLAY DEVICE INCLUDING A DEVICE CAPABLE OF REDUCING POWER CONSUMPTION IN RESPONSE TO EXPOSURE OF THE DISPLAY PANEL AND METHOD FOR DRIVING THE SAME

(71) Applicant: LG Display Co., Ltd., Seoul (KR)

(72) Inventors: Sun Cheol Noh, Incheon (KR); Tae Gung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/522,742

(22) Filed: Nov. 9, 2021

(65) Prior Publication Data

US 2022/0189412 A1   Jun. 16, 2022

(30) Foreign Application Priority Data

Dec. 16, 2020   (KR) .................. 10-2020-0176240

(51) Int. Cl.
| | | |
|---|---|---|
| *G06F 13/16* | (2006.01) | |
| *G09G 3/00* | (2006.01) | |
| *G09G 3/3275* | (2016.01) | |
| *H04N 5/63* | (2006.01) | |

(52) U.S. Cl.
CPC .......... *G09G 3/3275* (2013.01); *G09G 3/035* (2020.08); *G09G 2310/08* (2013.01); *G09G 2330/021* (2013.01); *G09G 2340/0407* (2013.01); *G09G 2370/08* (2013.01); *H04N 5/63* (2013.01)

(58) Field of Classification Search
CPC ................ G09G 3/035; G09G 3/3275; G09G 2330/021; G09G 2370/08; G09G 2310/08
See application file for complete search history.

(56) References Cited

U.S. PATENT DOCUMENTS

| | | | |
|---|---|---|---|
| 10,049,617 B2 | 8/2018 | Shin et al. | |
| 2017/0053592 A1 | 2/2017 | Shin et al. | |
| 2017/0200415 A1* | 7/2017 | Noguchi | ............. H01L 51/5012 |
| 2017/0367198 A1* | 12/2017 | Park | ................. H04M 1/0268 |
| 2018/0348846 A1* | 12/2018 | Lee | ........................ G06F 1/3218 |
| 2019/0146557 A1* | 5/2019 | Choi | ..................... G06F 1/1652 |
| | | | 361/749 |
| 2020/0152109 A1 | 5/2020 | Jung et al. | |

FOREIGN PATENT DOCUMENTS

| | | |
|---|---|---|
| KR | 10-2017-0023359 A | 3/2017 |
| KR | 10-2020-0056090 A | 5/2020 |

* cited by examiner

*Primary Examiner* — Sanghyuk Park
(74) *Attorney, Agent, or Firm* — Fenwick & West LLP

(57) ABSTRACT

A display device includes a display panel configured to display images, a data driver configured to supply data voltages to the display panel, and a controller configured to control the data driver, wherein the controller operates in a normal mode having normal driving conditions and a power saving mode having driving conditions for reducing power consumption and lowers a driving frequency and an environment of an interface connected to the data driver as compared to a driving frequency and an interface environment in the normal mode when operating in the power saving mode.

14 Claims, 19 Drawing Sheets

DISPLAY DEVICE INCLUDING A DEVICE CAPABLE OF REDUCING POWER CONSUMPTION IN RESPONSE TO EXPOSURE OF THE DISPLAY PANEL AND METHOD FOR DRIVING THE SAME

CROSS-REFERENCE TO RELATED APPLICATIONS

This application claims the benefit of Korean Patent Application No. 10-2020-0176240, filed on Dec. 16, 2020, which is hereby incorporated by reference as if fully set forth herein.

BACKGROUND OF THE INVENTION

Field of the Invention

The present invention relates to a display device and a method for driving the same.

Discussion of the Related Art

With the development of information technology, the market for display devices serving as connecting media between users and information is growing. Accordingly, display devices such as a light emitting display (LED), a quantum dot display (QDD), and a liquid crystal display (LCD) are increasingly used.

The aforementioned display devices include a display panel including sub-pixels, a driver that outputs driving signals for driving the display panel, and a power supply that generates power to be supplied to the display panel and the driver.

The display devices as described above can display images by transmitting light or directly emitting light through selected sub-pixels when driving signals, for example, a scan signal and a data signal, are supplied to sub-pixels formed in a display panel.

SUMMARY OF THE INVENTION

Accordingly, the present invention is directed to a display device and a method for driving the same that substantially obviate one or more problems due to limitations and disadvantages of the related art.

An object of the present invention is to reduce power consumption by changing driving conditions when a display area of a display panel is displayed on a specific space in a specific size (AOD) or depending on a degree of exposure of the display area of the display panel to the outside (change in the size of the display panel when a rollable function is used) to degrade a device driving environment and an interface environment.

To achieve these objects and other advantages and in accordance with the purpose of the invention, as embodied and broadly described herein, a display device includes a display panel configured to display images, a data driver configured to supply data voltages to the display panel, and a controller configured to control the data driver, wherein the controller operates in a normal mode having normal driving conditions and a power saving mode having driving conditions for reducing power consumption and lowers a driving frequency and an environment of an interface connected to the data driver as compared to a driving frequency and an interface environment in the normal mode when operating in the power saving mode.

The controller may decrease a resolution along with the driving frequency as compared to a resolution and the driving frequency in the normal mode when operating in the power saving mode.

The controller may decrease at least one of a data transmission rate, a number of data transmission lines, and data transmission traffic in the environment of the interface connected to the data driver as compared to that in the normal mode when operating in the power saving mode.

The controller may include two or more external memories for storing image data signals may not use some or all of the two or more external memories when operating in the power saving mode.

The controller may include an option controller configured to perform prior preparation for changing driving conditions by exchanging signals with at least one of internal circuits, an input controller configured to receive external image data signals, a memory controller configured to control read/write of external memories, and an interface controller configured to control an interface connected to an external device, wherein the controller may not use at least one of the input controller and the memory controller when operating in the power saving mode.

The interface controller may decrease at least one of a data transmission rate, a number of data transmission lines, and data transmission traffic in the environment of the interface connected to the data driver as compared to that in the normal mode when operating in the power saving mode.

When the display panel executes an always-on-display (AOD) function of always turning on a part of the display area in order to display a predetermined image in a predetermined size in a predetermined space, the controller may decrease the driving frequency, the number of external memories to be used, the data transmission rate, and the number of data transmission lines in the environment of the interface connected to the data driver as compared to those in the normal mode in the power saving mode.

The controller may further include a picture quality controller configured to perform picture quality processing for enhancing display quality on the image data signals, and the controller may not use the picture quality controller in the power saving mode.

The display device may further include a housing configured to control the display panel such that the display area of the display panel is exposed to the outside or accommodated in the housing, wherein, when operating in the power saving mode, the controller may decrease a resolution along with the driving frequency and the number of external memories to be used as compared to those in the normal mode according to a degree to which the display area of the display panel is exposed to the outside and decrease the data transmission rate, the number of data transmission lines, and the data transmission traffic in the environment of the interface connected to the data driver as compared to those in the normal mode.

The display device may further include an image provider configured to provide data signals to the controller, wherein the image provider may decrease the number of data transmission lines in the environment of the interface connected to the controller as compared to that in the normal mode when operating in the power saving mode.

The display device may further include a housing configured to control the display panel such that the display area of the display panel is exposed to the outside or accommodated in the housing, wherein, when operating in the power saving mode, the image provider may decrease a resolution as compared to that in the normal mode according to a degree to which the display area of the display panel is exposed to the outside, and decrease the number of data transmission lines in the environment of the interface connected to the controller as compared to that in the normal mode.

The image provider may decrease the resolution and the number of data transmission lines to half the resolution and the number of data transmission lines in the normal mode when about half the display area of the display panel is exposed to the outside of the housing.

The image provider may decrease the resolution and the number of data transmission lines to a quarter of the resolution and the number of data transmission lines in the normal mode when about a quarter of the display area of the display panel is exposed to the outside of the housing.

The controller may switch an environment of an interface connected between the image provider and the controller from a first communication interface to a second communication interface and supplies the data signals through the second communication interface when operating in the power saving mode.

The controller may further include a pattern generator configured to generate image patterns to be displayed on the display panel when operating in the power saving mode, wherein the interface connected between the image provider and the controller may not be when at least one of the image patterns is displayed on the display panel.

In another aspect of the present invention, a method for driving a display device including a display panel configured to display images, a data driver configured to supply data voltages to the display panel, and a controller configured to control the data driver includes driving the device in a normal mode having normal driving conditions and driving the device in a power saving mode having driving conditions for reducing power consumption, wherein the driving of the device in the power saving mode may include lowering a driving frequency and an environment of an interface connected between the controller and the data driver as compared to a driving frequency and an interface environment in the normal mode.

The driving of the device in the power saving mode may include not using some or all of external memories operating in connection with the controller.

The driving of the device in the power saving mode may include decreasing at least one of the driving frequency, a resolution, and a number of external memories to be used as compared to that in the normal mode, and decreasing at least one of a data transmission rate, a number of data transmission lines, and data transmission traffic in the environment of the interface connected between the controller and the data driver as compared to that in the normal mode.

The power saving mode may include an always-on-display (AOD) operation in which the display panel always turns on a part of a display area in order to display a predetermined image in a predetermined size in a predetermined space, and the driving frequency, the number of external memories to be used, and the data transmission rate and the number of data transmission lines in the environment of the interface connected to the data driver may be decreased as compared to those in the normal mode in the AOD operation.

The power saving mode may include a rollable operation of controlling the display panel such that the display area of the display panel is exposed to the outside of a housing or accommodated in the housing, and the driving frequency, the number of external memories to be used, and the resolution may be decreased as compared to those in the normal mode according to a degree to which the display area of the display panel is exposed to the outside, and the transmission rate, the number of data transmission lines, and data transmission traffic in the environment of the interface connected to the data driver may be decreased as compared to those in the normal mode in the rollable operation.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

A display device according to the present invention may be implemented as a television set, a video player, a personal computer (PC), a home theater system, an automobile electric device, a smartphone, and the like, but is not limited thereto. The display device according to the present invention may be implemented as a light emitting display (LED) device, a quantum dot display (QDD) device, a liquid crystal display (LCD) device, and the like.

However, an LED device that displays images in a manner of directly emitting light will be exemplified below for convenience of description. Although an LED device may be implemented based on an inorganic light emitting diode or an organic light emitting diode, an example in which an LED device is implemented based on an organic light emitting diode will be described for convenience of description.

Figure 1:
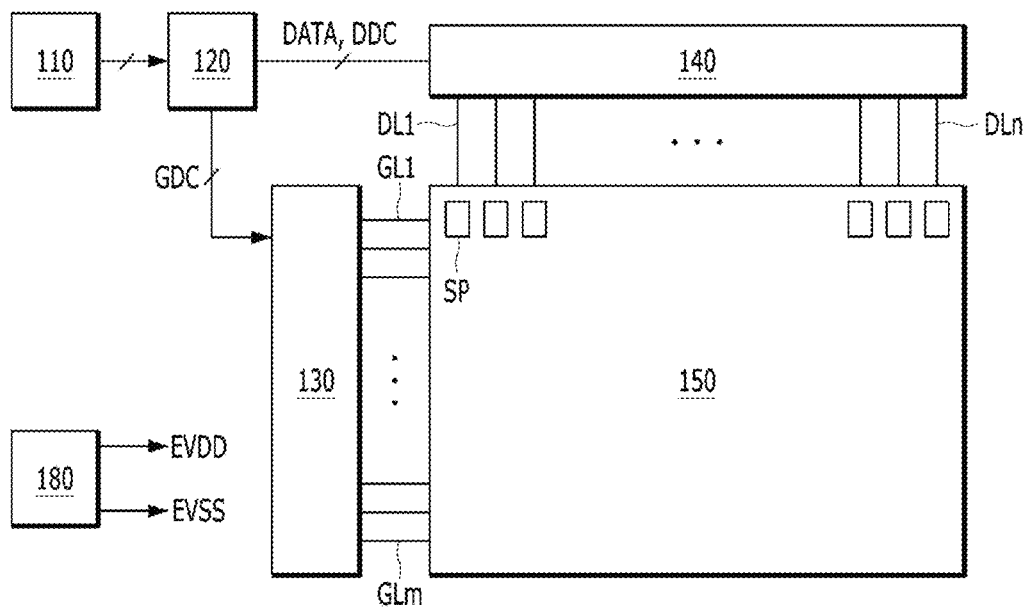
FIG. 1 is a block diagram schematically illustrating a configuration of a light emitting display device.
Figure 2:
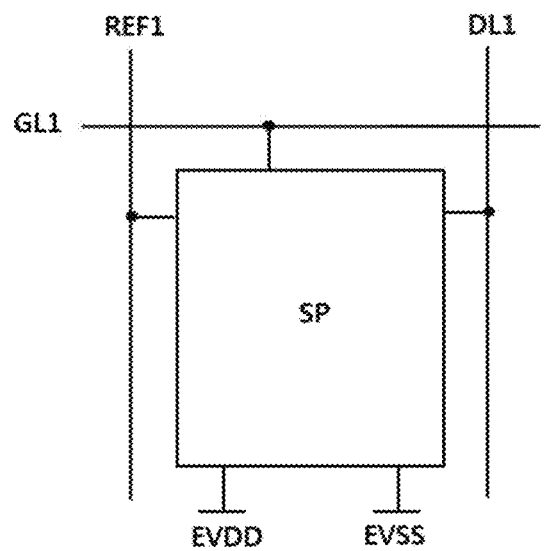
FIG. 2 is a block diagram schematically illustrating a configuration of a sub-pixel included in a display panel.
Figure 3:
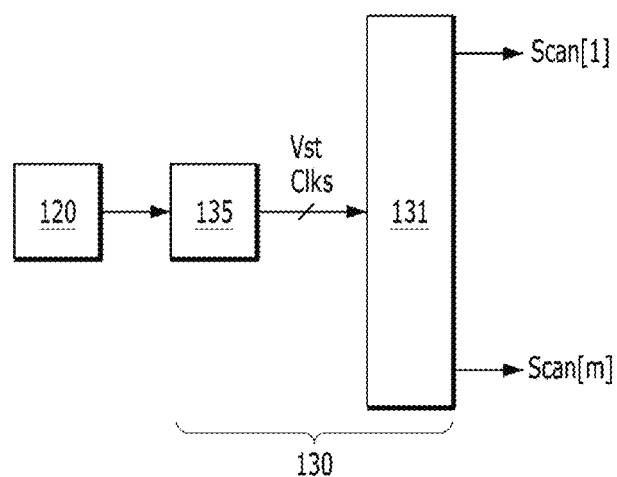
FIG. 3 illustrates a configuration of a device related to a gate-in-panel type scan driver.
Figure 4A:
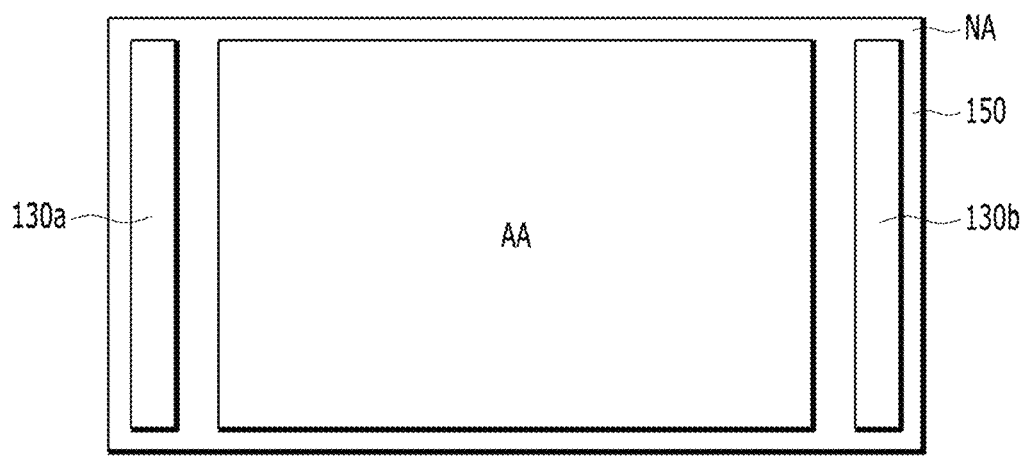
FIGS. 4A and 4B illustrate arrangement of the gate-in-panel type scan driver.
Figure 4B:
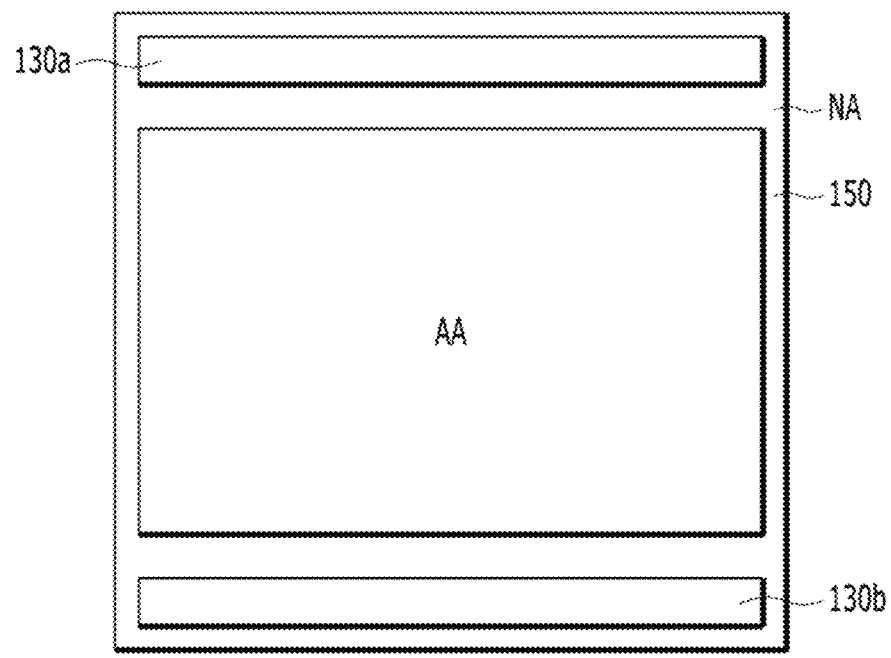

FIG. 1 is a block diagram schematically illustrating a configuration of an LED device, FIG. 2 is a block diagram schematically illustrating a configuration of a sub-pixel included in a display panel, FIG. 3 illustrates a configuration of a device related to a gate-in-panel type scan driver, and FIGS. 4A and 4B illustrate arrangement of the gate-in-panel type scan driver.

As illustrated in FIG. 1 to FIGS. 4A and 4B, the LED device may include an image provider 110, a timing controller 120, a scan driver 130, a data driver 140, a display panel 150, and a power supply 180.

The image provider 110 (set of a host system) may output various driving signals along with an image data signal supplied from the outside or an image data signal stored in an internal memory. The image provider 110 may provide a data signal and various driving signals to the timing controller 120.

The timing controller 120 may output a gate timing control signal GDC for controlling operation timing of the scan driver 130, a data timing control signal DDC for controlling operation timing of the data driver 140, and various synchronization signals (a vertical synchronization signal Vsync and a horizontal synchronization signal Hsync). The timing controller 120 may provide a data signal DATA supplied from the image provider 110 along with the data timing control signal DDC to the data driver 140. The timing controller 120 may be configured as an integrated circuit (IC) and may be mounted on a printed circuit board, but the present invention is not limited thereto.

The power supply 180 may transform external power into first power at a high level and second power at a low level under the control of the timing controller 120 and output the first power and the second power through a first power line EVDD and a second power line EVSS. The power supply 180 may generate and output voltages (e.g., gate voltages including a gate high voltage and a gate low voltage) necessary for operation of the scan driver 130 and voltages (e.g., drain voltages including a drain voltage and a half drain voltage) necessary for operation of the data driver 140 as well as the first power and the second power.

The data driver 140 may sample and latch a data signal DATA in response to the data timing control signal DDC supplied from the timing controller 120, convert the data signal in a digital form into a data voltage in an analog form on the basis of a gamma reference voltage, and output the data voltage. The data driver 140 may provide the data voltage to sub-pixels included in the display panel 150 through data lines DL1 to DLn. The data driver 140 may be formed in the form of an IC and mounted on the display panel 150 or mounted on a printed circuit board, but the present invention is not limited thereto.

The display panel 150 may display an image in response to driving signals including a scan signal and a data voltage and power. The sub-pixels of the display panel 150 directly emit light. The display panel 150 may be manufactured based on a rigid or flexible substrate such as a glass substrate, a silicon substrate, or a polyimide substrate. The sub-pixels emitting light may include red, green and blue pixels or red, green, blue, and white pixels.

A single sub-pixel SP may be connected to a first data line DL1, a first scan line GL1, the first power line EVDD, and the second power line EVSS. A single sub-pixel SP may include a switching transistor, a driving transistor, a capacitor, and an organic light emitting diode. A sub-pixel may include not only an organic light emitting diode but also a circuit for compensating for deterioration of a driving transistor that supplies driving current to the organic light emitting diode.

The scan driver 130 may output a scan signal (or a scan voltage) in response to the gate timing control signal GDC supplied from the timing controller 120. The scan driver 130 may provide the scan signal to the sub-pixels included in the display panel 150 through scan lines GL1 to GLm. The scan driver 130 may be formed in the form of an IC or directly formed on the display panel 150 in a gate in panel structure.

The gate-in-panel type scan driver 130 may include a shift register 131 and a level shifter 135. The level shifter 135 may generate and output one or more clock signals Clks and a start signal Vst based on signals output from the timing controller 120. The clock signals Clks may be generated and output in the form of K (K being an integer equal to or greater than 2) different phases such as 2 phases, 4 phases, or 8 phases.

The shift register 131 operates based on the signals Clks and Vst output from the level shifter 135 and may output scan signals Scan[1] to Scan[m] for turning on or off thin film transistors formed in the display panel 150. The shift register 131 is formed in the form of a thin film on the display panel 150 in a gate in panel structure.

The shift register 131 may be generally arranged in a non-display area NA of the display panel 150. Here, the shift register 131 may be arranged in left and right non-display areas NA of the display panel 150, as shown in FIG. 4A, or may be arranged in upper and lower non-display areas NA of the display panel 150, as shown in FIG. 4B.

Although FIGS. 4A and 4B illustrate an example in which a first shift register 131a and a second shift register 131b are arranged in the non-display areas NA on the left and right sides or upper and lower sides of a display area AA, only a single shift register may be arranged in the left, right, upper, or lower non-display area NA. Further, the shift register 131 may be divided and arranged in the non-display area NA and the display area AA or may be arranged in the display area AA in a distributed manner.

In addition, the level shifter 135 may be formed in the form of an independent IC or may be included in the power supply 180 distinguished from the shift register 131. However, this is merely an example, and the display device may be implemented in various forms such as a configuration in which at least one of the timing controller 120, the scan driver 130, and the data driver 140 is integrated in a single IC according to an LED device implementation method.

Figure 5:
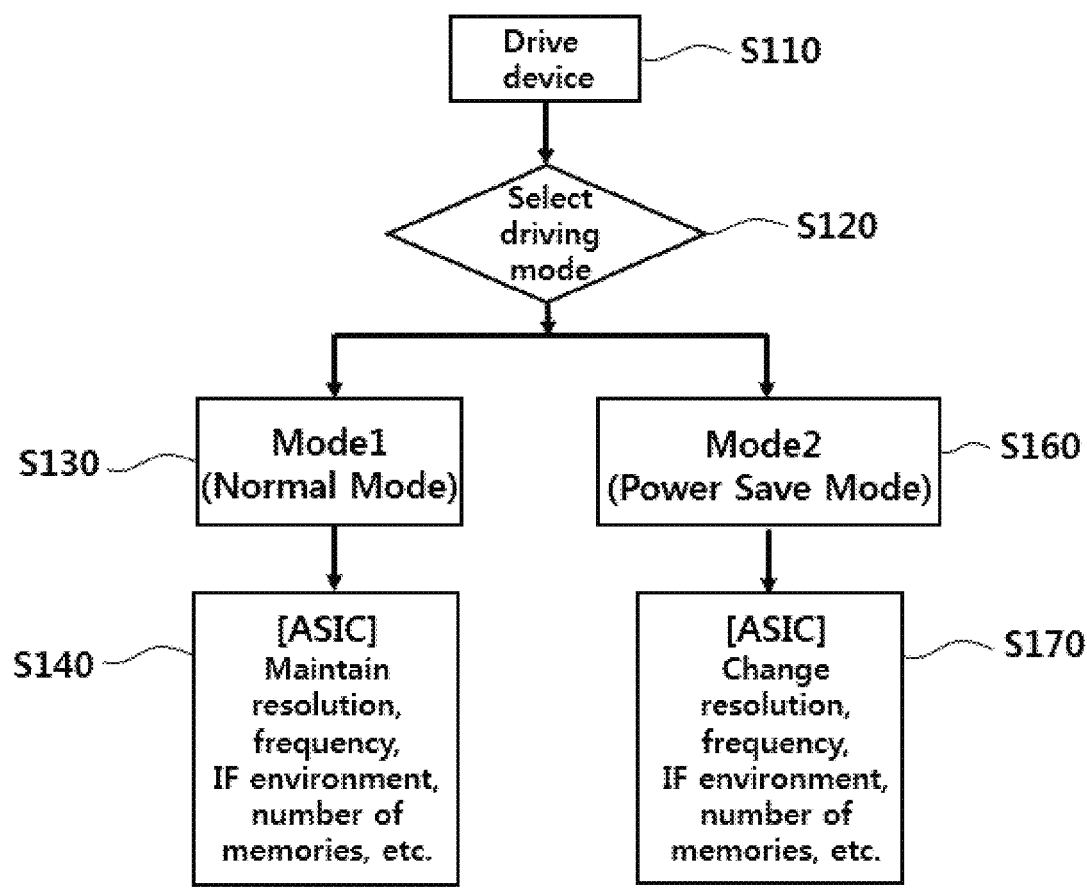
FIG. 5 is a flowchart illustrating a method for driving a light emitting display device according to a first embodiment of the present invention.
Figure 6:
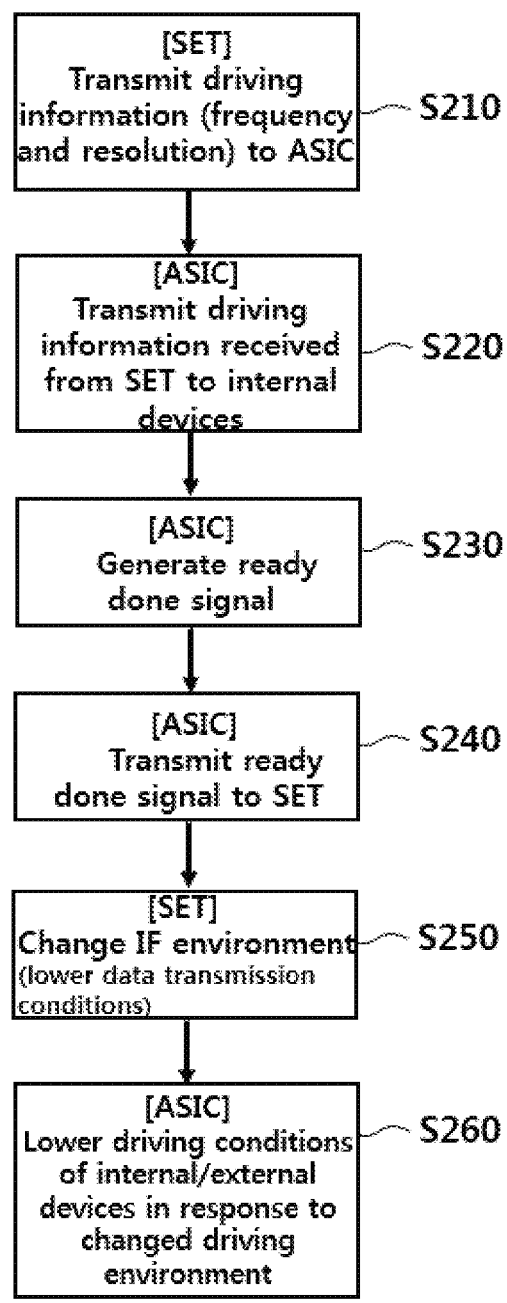
FIG. 6 is a flowchart for describing a power saving mode of FIG. 5 in more detail.

FIG. 5 is a flowchart illustrating a method for driving an LED device according to a first embodiment of the present invention and FIG. 6 is a flowchart for describing a power saving mode of FIG. 5 in more detail.

As illustrated in FIG. 5, the LED device according to the first embodiment of the present invention can change a driving environment in response to at least two driving modes in order to reduce power consumption. This will be described below.

When the device operates (S110), a driving mode may be selected (S120). Here, a driving mode may be selected according to user input or according to a set value set in the device when an external image data signal is not input or the same image data signal is continuously input for a specific time.

Driving modes may include a first driving mode Mode1 and a second driving mode Mode2. The first driving mode Mode1 may be called a normal mode in which an image is displayed under normal driving conditions. The second driving mode Mode2 may be called a power saving mode in which an image is displayed under specific driving conditions for reducing power consumption.

When the first driving mode Mode1 is selected (S130), a semiconductor chip ASIC that controls the display panel may operate to maintain driving conditions such as a normal resolution, frequency, interface (IF) environment, and number of memories to be used (S140).

When the second driving mode Mode2 is selected (S160), the semiconductor chip ASIC that controls the display panel may operate to change at least one of the resolution, the frequency, the interface (IF) environment, and the number of memories to be used in the first driving mode Mode1 (S170).

Changing driving conditions in the second driving mode Mode2 means lowering driving conditions in the first driving mode Mode1. High-level circuits capable of controlling operation under the aforementioned conditions include the semiconductor chip ASIC that controls the display panel and a set that controls the semiconductor chip in an LED device, and thus description will be given in more detail based thereon.

As illustrated in FIG. 6, the set may transmit driving information such as a frequency and a resolution to the semiconductor chip ASIC (S210). The semiconductor chip ASIC may transmit the driving information such as the frequency and resolution received from the set SET to internal devices (S220).

The internal devices of the semiconductor chip ASIC may prepare a state in which driving conditions can be changed based on the driving information such as the frequency and resolution and generate a signal representing readiness for changing driving conditions ("ready done" signal) (S230). Further, the semiconductor chip ASIC may transmit the ready done signal to the set SET to notify the set SET of readiness for changing driving conditions (S240).

The set SET may change an interface (IF) environment between the set SET and the semiconductor chip ASIC upon determining that driving conditions for the internal devices of the semiconductor chip ASIC can be changed based on the ready done signal (S250). Here, the set SET may lower data transmission conditions and the like in the interface IF connected with the semiconductor chip ASIC and then transmit various control signals and a data signal to the semiconductor chip ASIC through the changed interface (IF) environment. The semiconductor chip ASIC may lower driving conditions for internal/external devices in response to the driving environment changed by the set SET (S260). Here, the semiconductor chip ASIC may lower the resolution, the frequency, the number of memories to be used, and an interface (IF) environment established between the semiconductor ASIC and devices (e.g., data driver and the like) controlled thereby.

Hereinafter, circuits related to the LED device realized according to the above-described first embodiment will be described. In the following description, the set SET is defined as an image provider and the semiconductor chip ASIC is defined as a timing controller.

Figure 7:
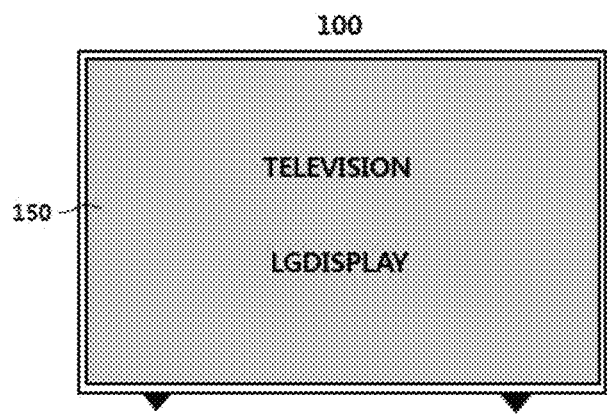
FIG. 7 illustrates a television set realized according to a second embodiment of the present invention.
Figure 8:
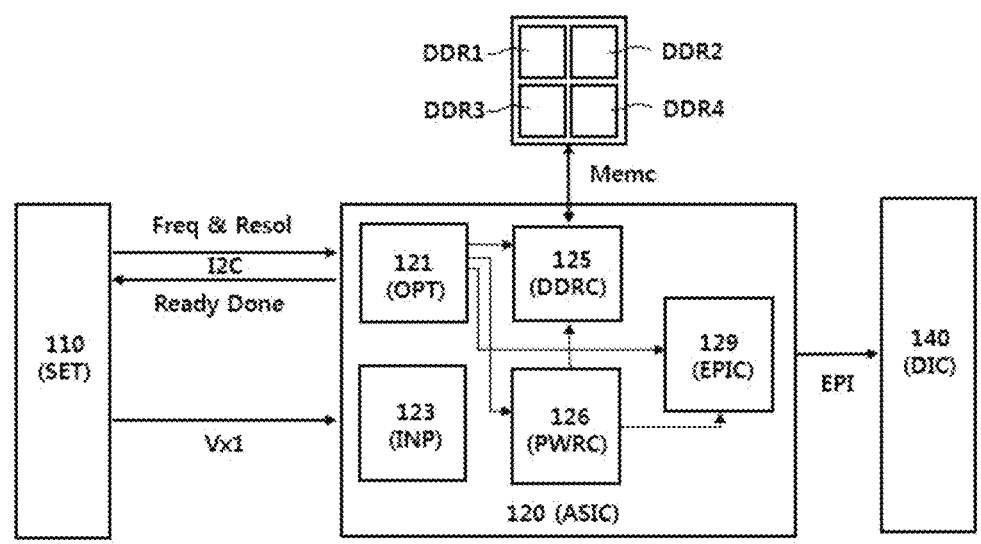
FIG. 8 is a diagram for describing principal devices included in the television set of FIG. 7 according to the second embodiment of the present invention.
Figure 9:
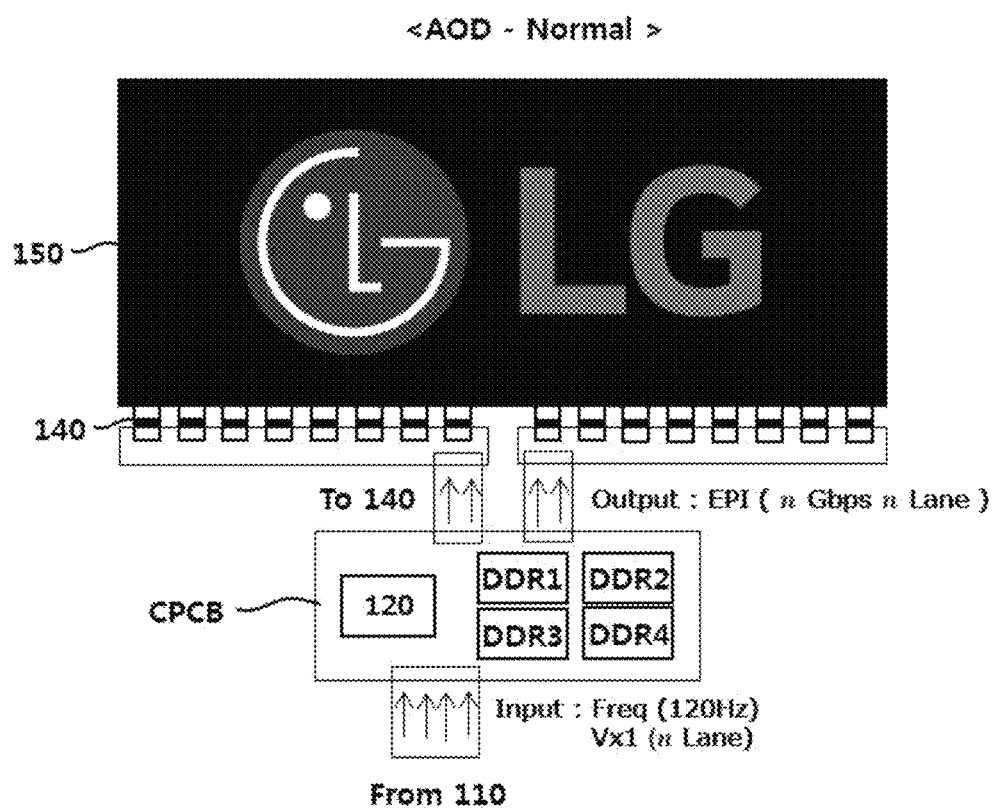
FIG. 9 and FIG. 10 are diagrams showing examples of driving conditions for driving modes.
Figure 10:
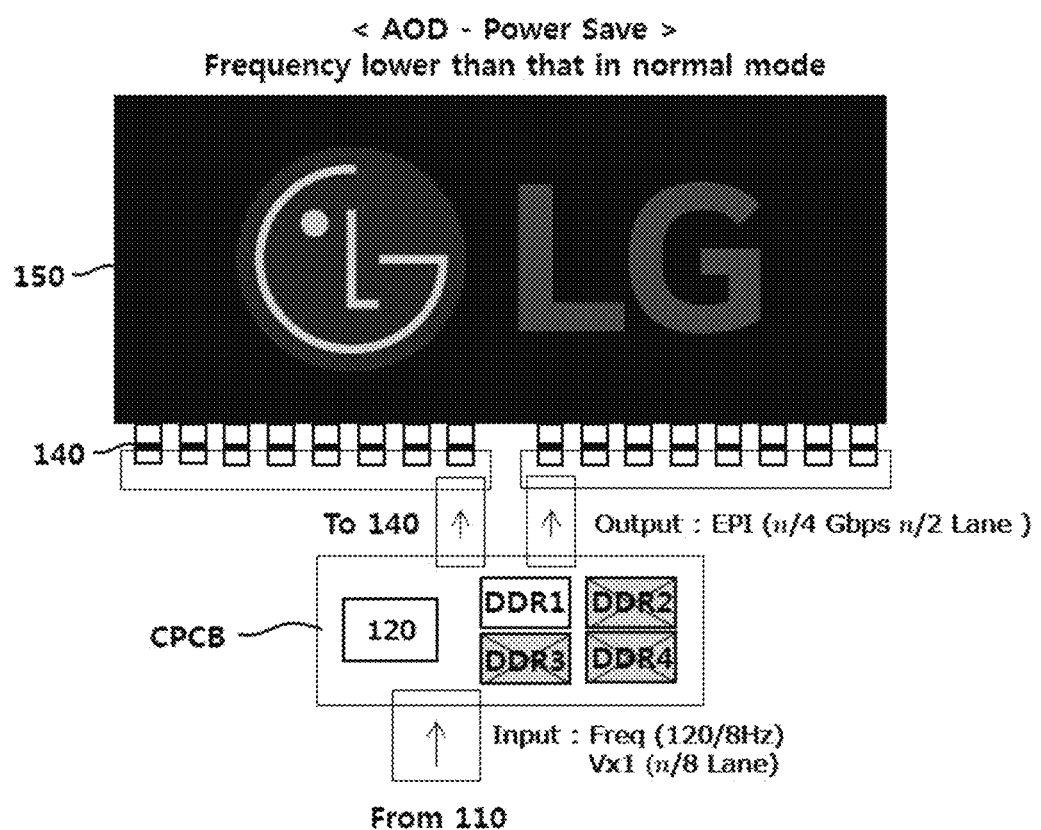

FIG. 7 illustrates a television set realized according to a second embodiment of the present invention, FIG. 8 is a diagram for describing principal devices included in the television set of FIG. 7 according to the second embodiment of the present invention, and FIG. 9 and FIG. 10 are diagrams showing examples of driving conditions for driving modes.

As illustrated in FIG. 7 and FIG. 8, a television set 100 may include a display panel 150 capable of displaying images, and an image provider 110 (SET), a timing controller 120 (ASIC), a memory unit DDR1 to DDR4, and a data driver 140 (DIC) which operate in connection with the display panel 150.

The timing controller 120 may include an option controller 121 (OPT), a memory controller 125 (DDRC), an input controller 123 (INP), a power controller 126 (PWRC), and an interface controller 129 (EPIC).

The option controller 121 may perform prior preparation for changing driving conditions by exchanging signals with at least one of circuits included in the timing controller 120. To this end, the option controller 121 may receive driving information such as a frequency Freq and a resolution Resol from the image provider 110. The option controller 121 may transmit a driving condition change signal representing change of driving conditions to at least one of the circuits included in the timing controller 120 based on the driving information.

Upon reception of the driving condition change signal from the option controller 121, the circuits may output a completion signal representing that a state in which driving conditions can be changed is ready. The option controller 121 may generate a signal ("ready done" signal) representing readiness for changing driving conditions of at least one of the circuits included in the timing controller 120 based on the completion signal. The option controller 121 may transmit the ready done signal to the image provider 110.

The memory controller 125 may control memories included in the memory unit DDR1 to DDR4. The memory controller 125 may select at least one of external memories included in the memory unit DDR1 to DDR4 and store or read data in or from the selected memory.

The memory unit DDR1 to DDR4 may store image data signals and a compensation signal. Although double data rate synchronous dynamic random access memories (DDR SDRAMs) may be used as the external memories DDR1 to DDR4 in order to store the image data signals and compensation signals, the present invention is not limited thereto.

The power controller 126 may manage and control power of devices included in the timing controller 120 and external devices. The power controller 126 (PWRC) may manage and control power of devices provided inside/outside the timing controller 120 in response to change in the driving environment of the device.

The interface controller 129 may control an interface connected between the timing controller 120 and a device operating in connection with the timing controller 120. The interface controller 129 may control an embedded clock point-to-point interface (EPI) connected between the timing controller 120 and the data driver 140. The interface controller 129 may control a V-by-one (hereinafter, V×1) interface connected between the timing controller 120 and the image provider 110.

The display panel 150 of the television set 100 may use an always-on-display (AOD) function of always displaying a specific image in a part of the display area to display the specific image (predetermined image) while reducing power consumption. Accordingly, a normal mode and a power saving mode when the AOD function is used according to the second embodiment will be described below. However, the present invention is not limited to interfaces which will be described below.

As illustrated in FIG. 8 and FIG. 9, driving conditions for the normal mode (AOD—Normal) when the AOD function is used may be as follows.

(1) Input resolution: 4400×2250 (including normal Vblank and Hblank)

(2) Input frequency: 120 Hz (3) Number of V×1 lanes: total data transmission traffic/dclk (data clock)

4400×2250×120 Hz/74.25 MHz=16 lanes (4) Number of memories to be used: DDR1 to DDR4

(5) EPI bandwidth/lane: 100 MHz×24 UI (User Interface)=2.4 Gbps, 32 lanes

As illustrated in FIG. 8 and FIG. 10, driving conditions for the power saving mode (AOD—Power Save) when the AOD function is used may be as follows.

(1) Input resolution: 4400×2250 (including normal Vblank and Hblank)

(2) Input frequency: 15 Hz (3) Number of V×1 lanes: Total data transmission traffic/dclk (data clock)

4400×2250×15 Hz/74.25 MHz=2 lanes (4) Number of memories to be used: DDR1 (one of DDR2, DDR3, and DDR4 is possible)

(5) EPI bandwidth/lane: 25 MHz×24 UI (User Interface)=0.6 Gbps, 16 lanes

The driving conditions for the normal mode (AOD—Normal) and the driving conditions for the power saving mode (AOD—Power Save) will be described in comparison.

The input frequency of the timing controller 120 mounted on a control board CPCB may be reduced from 120 Hz to 15 Hz (120/8 Hz). That is, when the driving conditions are changed to those for the power saving mode, the input frequency (driving frequency) of the timing controller 120 can be reduced.

The number of lanes of a first interface V×1 between the image provider 110 and the timing controller 120 may be reduced from 16 lanes to 2 lanes (n/8 lanes). That is, when the driving conditions for the first interface between the image provider 110 and the timing controller 120 are changed to those for the power saving mode, the number of lanes (the number of transmission lines) of the first interface V×1 between the image provider 110 and the timing controller 120 can be reduced.

The number of memories DDR1 to DDR4 operating in connection with the timing controller 120 may be reduced from four to one. That is, when the driving conditions are changed to those for the power saving mode, the number of memories DDR1 to DDR4 used by the timing controller 120 can be reduced.

The bandwidth and the number of lanes of a second interface EPI connected between the timing controller 120 and the data driver 140 may be reduced from 2.4 Gbps and 32 lanes to 0.6 Gbps and 16 lanes (n/4 Gbps and n/2 lanes). That is, when the driving conditions are changed to those for the power saving mode, the bandwidth and the number of lanes (the data transmission rate and the number of transmission lines) of a second interface EPI connected between the timing controller 120 and the data driver 140 can be reduced.

As described above, when the driving conditions for the normal mode (AOD—Normal) are changed to the driving conditions for the power saving mode (AOD—Power Save) when the AOD function is used, driving environments (frequency and the like) and interface environments of devices included in the image provider 110, the timing controller 120, and the data driver 140 can be lowered and thus power consumption can be reduced.

Figure 11:
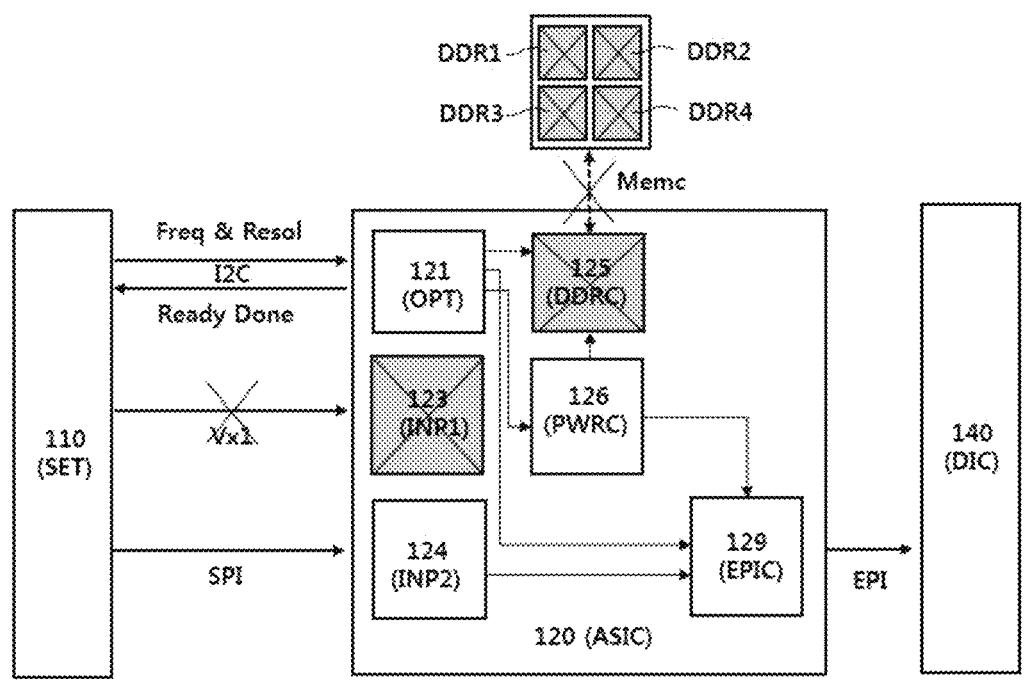
FIG. 11 is a diagram for describing principal devices included in the television set of FIG. 7 according to a third embodiment of the present invention.

FIG. 11 is a diagram for describing principal devices included in the television set of FIG. 7 according to a third embodiment of the present invention. Hereinafter, the third embodiment will be described focusing on parts changed from the second embodiment.

As illustrated in FIG. 11, the timing controller 120 may include the option controller 121 (OPT), the memory controller 125 (DDRC), a first input controller 123 (INP1), a second input controller 124 (INP2), the power controller 126 (PWRC), and the interface controller 129 (EPIC).

Interfaces connected between the image provider 110 and the timing controller 120 may further include a third interface such as a serial peripheral interface (SPI) in addition to the first interface V×1.

The image provider 110 may transmit only an image data signal to the timing controller 120 through the SPI. The timing controller 120 may receive the image data signal, which is input through the SPI, via the second input controller 124 and store the image data signal in the memory unit DDR1 to DDR 4 or directly transmit the image data signal to the interface controller 129 without compensating for or performing image processing on the image data signal.

When driving conditions are changed to driving conditions for the power saving mode when the AOD function is used, environments in which devices, such as the option controller 121 necessary to select driving conditions, the second input controller 124 for receiving image data signals, and the interface controller 129 for outputting image data signals, are used may be minimized (optimized). In other words, the first input controller 123, the memory controller 125, and all memories DDR1 to DDR4 included in the memory unit DDR1 to DDR4 may be switched to an unused state (a device off state, a disabled state, or an idle state).

As described above, driving environments and interface environments of devices when driving conditions for the normal mode are changed to driving conditions for the power saving mode at the time of using the AOD function can be lowered, and when devices other than devices necessary for the mode have been switched to an unused state, power consumption can be additionally reduced (super-low power AOD).

Figure 12:
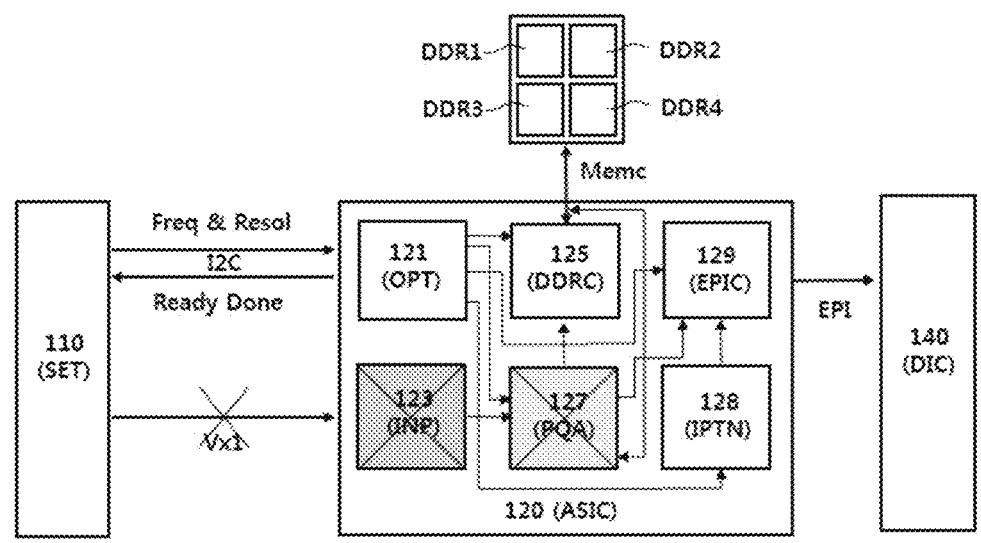
FIG. 12 is a diagram for describing principal devices included in the television set of FIG. 7 according to a fourth embodiment of the present invention.
Figure 13:
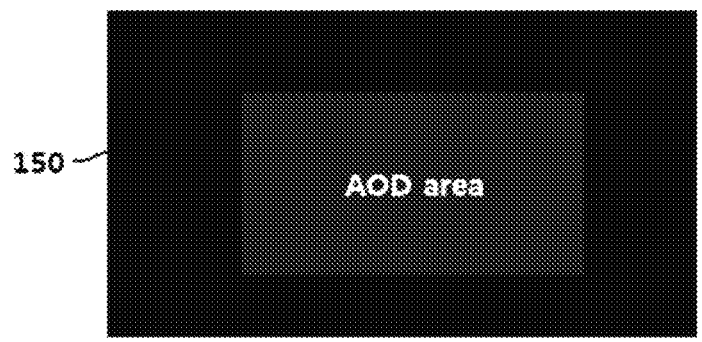
FIG. 13 illustrates an AOD area.

FIG. 12 is a diagram for describing principal devices included in the television set of FIG. 7 according to a fourth embodiment of the present invention and FIG. 13 illustrates an AOD area. Hereinafter, the fourth embodiment will be described focusing on parts changed from the second embodiment. In the fourth embodiment, the power controller 126 is not switched to an unused state because it manages power of devices, and thus illustration of the power controller 126 is omitted.

As illustrated in FIG. 12 and FIG. 13, the timing controller 120 may include the option controller 121 (OPT), the memory controller 125 (DDRC), the first input controller 123 (INP1), the power controller 126 (PWRC), a picture quality controller 127 (PQA), a pattern generator 128 (IPTN), and the interface controller 129 (EPIC).

The pattern generator 128 may generate various image patterns to be displayed on the AOD area. The pattern generator 128 may operate (may be enabled) under the control of the option controller 121 when driving conditions are changed to driving conditions for the power saving mode at the time of using the AOD function. The pattern generator 128 may transmit the generated images patterns to the interface controller 129.

The picture quality controller 127 may perform picture quality processing for enhancing display quality for an image data signal input through the first input controller 123. The picture quality controller 127 may read an image data signal stored in the memory unit DDR1 to DDR4 and perform picture quality processing on the read image data signal.

When driving conditions are changed to those for the power saving mode at the time of using the AOD function, an image may be displayed in the AOD area based on the image patterns generated by the pattern generator 128 instead of an image data signal output from the image provider 110. Accordingly, the first interface V×1 connected between the image provider 110 and the timing controller 120, the first input controller 123, and the picture quality controller 127 may be switched to an unused state (a device off state, a disabled state, or an idle state).

As described above, when driving conditions are changed to driving conditions for the power saving mode at the time of using the AOD function, environments in which devices, such as the option controller 121, the memory controller 125, all memories DDR1 to DDR4 included in the memory unit DDR1 to DDR4, the pattern generator 128, and the interface controller 129, are used can be minimized (optimized) to reduce power consumption.

Figure 14:
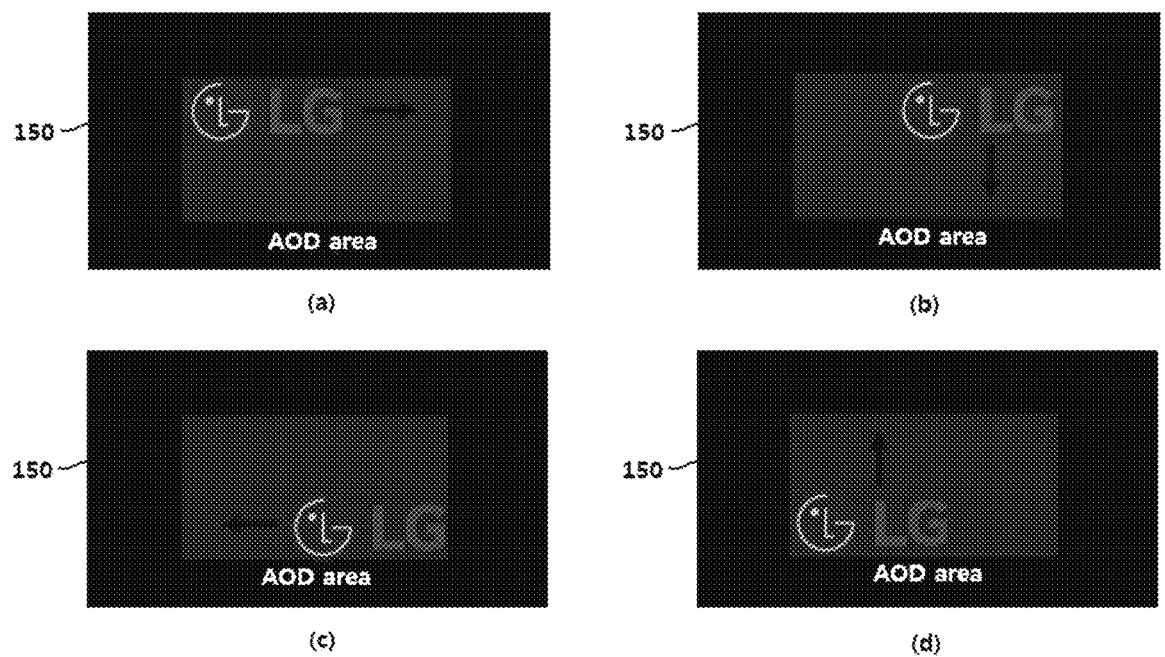
FIG. 14 and FIG. 15 are diagrams for describing image control in an AOD area and change in a device driving environment according thereto according to a modified example of the fourth embodiment of the present invention.
Figure 15:
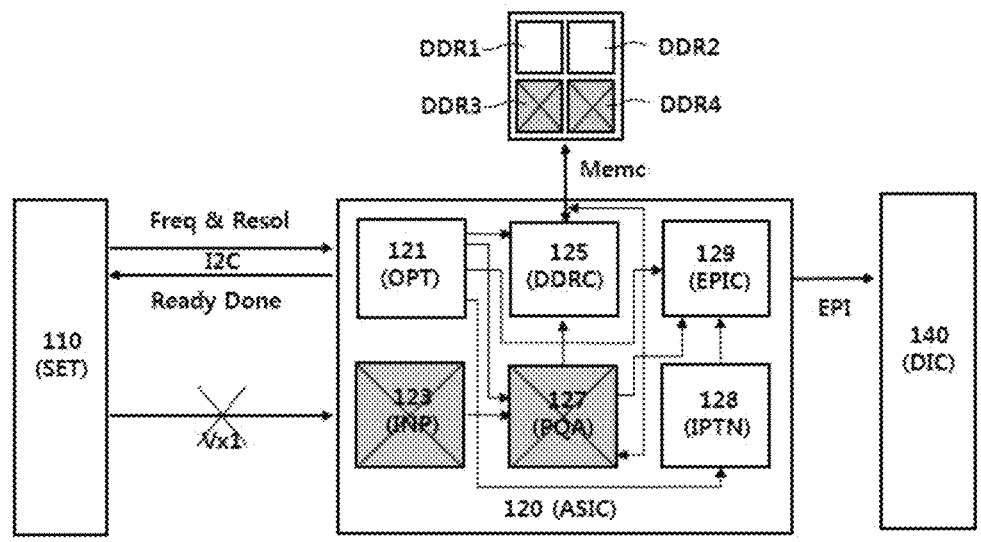

FIG. 14 and FIG. 15 are diagrams for describing image control in an AOD area and change in a device driving environment according thereto according to a modified example of the fourth embodiment of the present invention.

As illustrated in FIG. 13, an image may be displayed in the AOD area defined in the display panel 150 and fixed in a specific size (predetermined size) in a specific space (predetermined space). A specific image (LG logo) displayed in the AOD area may move as shown in parts (a) to (d) of FIG. 14. For example, the specific image (LG logo) displayed in the AOD area may move in the order of the top left corner, the top right corner, the bottom right corner, the bottom left corner, and the top left corner.

As illustrated in FIG. 14 and FIG. 15, the specific image (LG logo) displayed in the AOD area and a movement direction thereof may depend on a display mode set in the pattern generator 128.

When the AOD area is fixed in a specific size in a specific space and a specific image (LG logo) displayed therein moves as described above, an image data signal can be sufficiently compensated even if only some memories (e.g., DDR1 and DDR2) are used. Accordingly, at least some of the memories DDR1 to DDR4 as well as the first interface V×1 connected between the image provider 110 and the timing controller 120, the first input controller 123, the picture quality controller 127 can be switched to an unused state (a device off state, a disabled state, or an idle state).

As described above, when driving conditions are changed to those for the power saving mode at the time of using the AOD function, environments in which devices are used can be minimized (optimized) by switching at least some of the memories DDR1 to DDR4 to the unused state to reduce power consumption.

Figure 16:
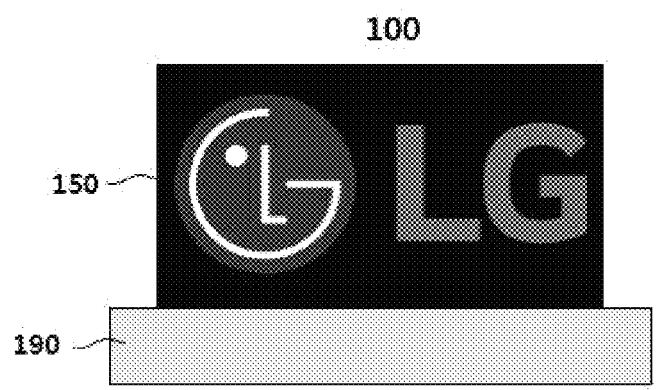
FIG. 16 and FIG. 17 are diagrams for describing a rollable television set according to a fifth embodiment of the present invention.
Figure 17:
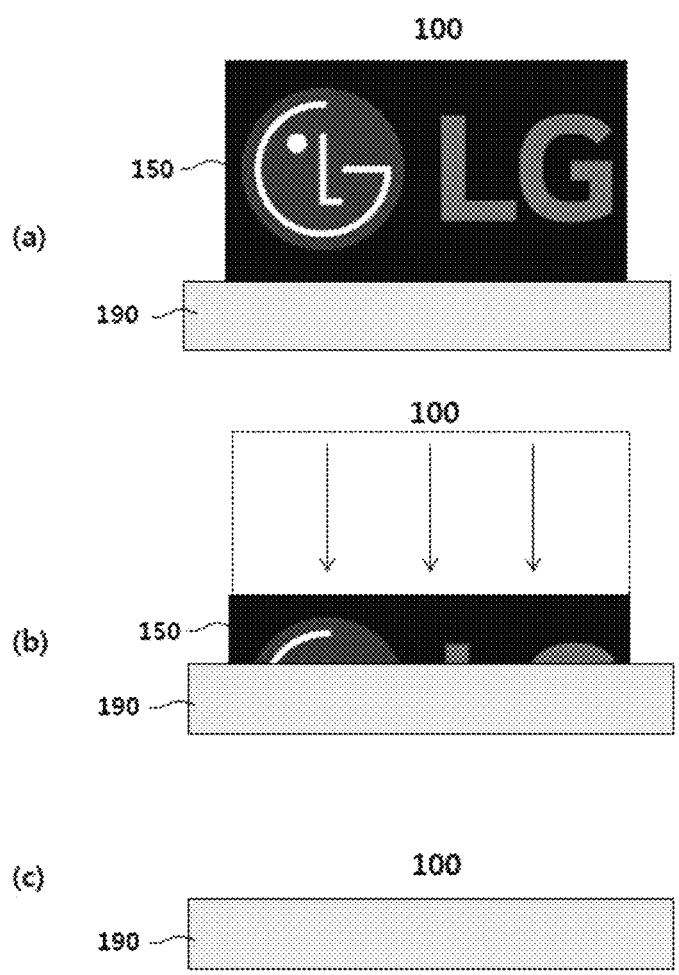
Figure 18:
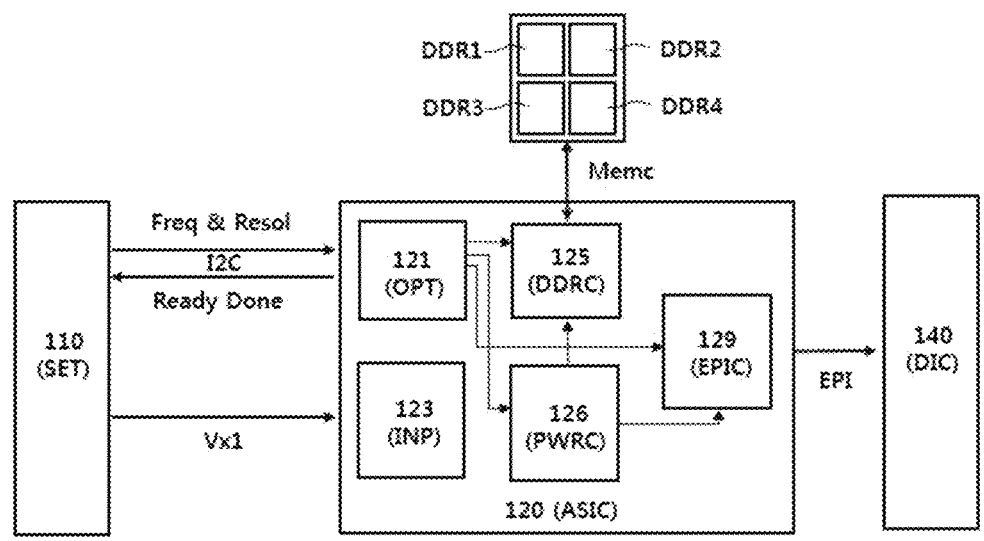
FIG. 18 is a diagram for describing principal devices included in the rollable television set of FIG. 16 according to the fifth embodiment of the present invention.
Figure 19:
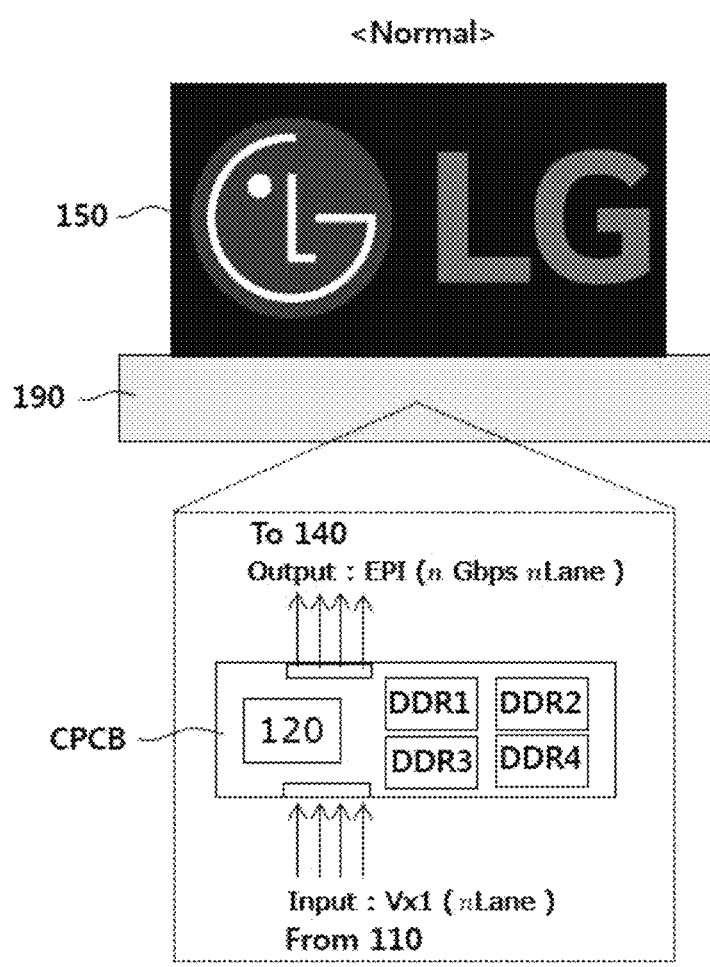
FIG. 19 to FIG. 21 are diagrams showing examples of driving conditions for driving modes.
Figure 20:
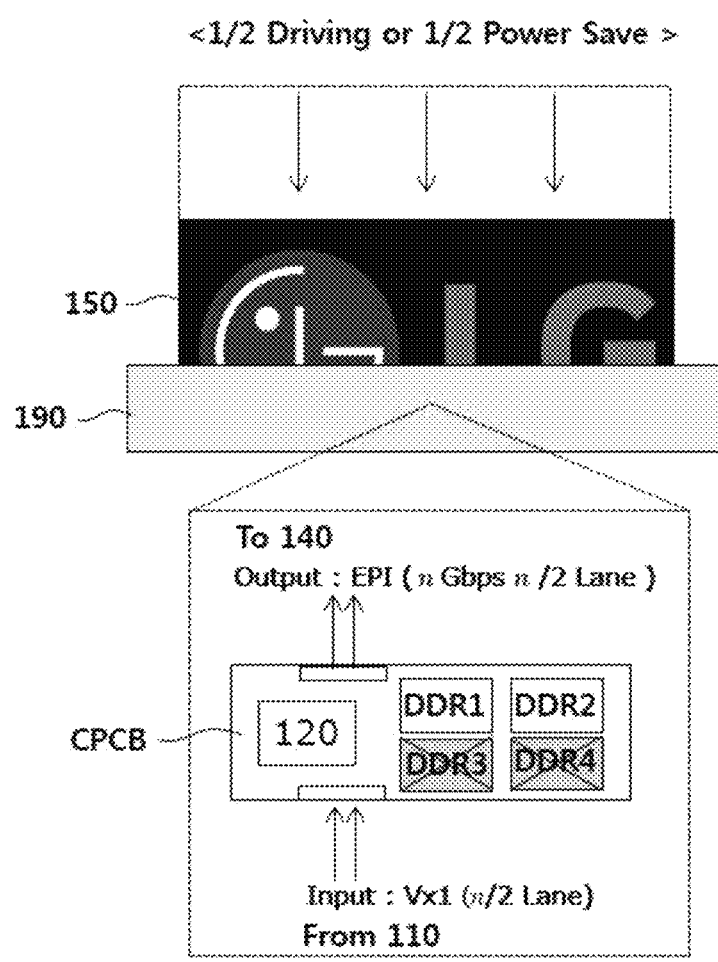
Figure 21:
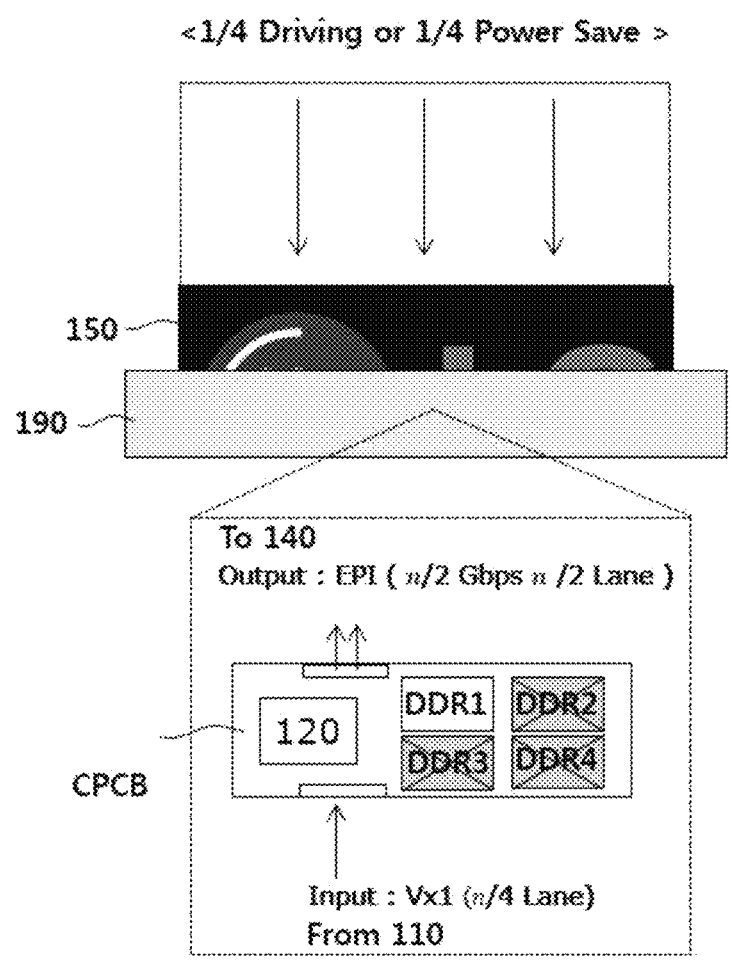

FIG. 16 and FIG. 17 are diagrams for describing a rollable television set according to a fifth embodiment of the present invention, FIG. 18 is a diagram for describing principal devices included in the rollable television set of FIG. 16 according to the fifth embodiment of the present invention, and FIG. 19 to FIG. 21 are diagrams showing examples of driving conditions for driving modes;

As illustrated in FIG. 16 and FIG. 17, the LED device according to the present invention may be implemented as a rollable television set 100 having a display panel 150 accommodated in a housing 190. The housing 190 may control the display panel 150 such that the display area of the display panel 150 is exposed to the outside or accommodated therein.

The rollable television set may display an image in a state in which the whole display area is exposed to the outside of the housing 190, as shown in FIG. 17, part (a) or display an image in a state in which a part of the display area is exposed, as shown in FIG. 17, part (b), or the whole display area is rolled and accommodated in the housing 190 (in a non-display state or a compensation state), as shown in FIG. 17, part (c).

As illustrated in FIG. 16 and FIG. 18, the timing controller 120 may include the option controller 121 (OPT), the memory controller 125 (DDRC), the first input controller 123 (INP1), the power controller 126 (PWRC), and the interface controller 129 (EPIC). That is, circuits related to the display panel 150 in the rollable television set 100 may be similar to those in the above-described embodiments. However, the rollable television set 100 may change device operation conditions in response to an exposed state of the display area as follows.

As illustrated in FIG. 19, a state in which the whole display area of the display panel 150 is exposed to the outside of the housing 190, as shown in FIG. 19, may be referred to as a normal mode. In addition, a state in which about half the display area of the display panel 150 is exposed to the outside of the housing 190, as shown in FIG. 20, may be referred to as a half driving mode (½ Driving) or a half power saving mode (½ Power Save). Further, a state in which about a quarter of the display area of the display panel 150 is exposed to the outside of the housing 190, as shown in FIG. 21, may be referred to as a quarter driving mode (¼ Driving) or a quarter power saving mode (¼ Power Save) (second power saving mode).

As illustrated in FIG. 18 and FIG. 19, driving conditions for the normal mode in which the whole display area of the display panel 150 is exposed to the outside of the housing 190 may be as follows.

(1) Input resolution: 4400×2250 (including normal Vblank and Hblank)

(2) Input frequency: 120 Hz (3) Number of V×1 lanes: total data transmission traffic/dclk (data clock)

4400×2250×120 Hz/74.25 MHz=16 lanes (4) Number of memories to be used: DDR1 to DDR4

(5) EPI bandwidth/lane: 100 MHz×24 UI (User Interface)=2.4 Gbps, 32 lanes

As illustrated in FIG. 18 and FIG. 20, driving conditions for the half driving mode (½ driving) or half power saving mode (½ power save) (first power saving mode) in which about half the display area of the display panel 150 is exposed to the outside of the housing 190 may be as follows.

(1) Input resolution: 4400×1125 (including estimated Vblank and Hblank)

(2) Input frequency: 120 Hz (3) Number of V×1 lanes: total data transmission traffic/dclk (data clock)

4400×1125×120 Hz/74.25 MHz=8 lanes (4) Number of memories to be used: DDR1 and DDR2 (which may be replaced with DDR3 and DDR4)

(5) EPI bandwidth/lane: 100 MHz×24 UI (User Interface)=2.4 Gbps, 16 lanes

As illustrated in FIG. 18 and FIG. 21, driving conditions for the quarter driving mode (¼ Driving) or quarter power saving mode (¼ Power Save) (second power saving mode) in which about a quarter of the display area of the display panel 150 is exposed to the outside of the housing 190 may be as follows.

(1) Input resolution: 4400×563 (including estimated Vblank and Hblank)

(2) Input frequency: 120 Hz (3) Number of V×1 lanes: total data transmission traffic/dclk (data clock)

$$4400 \times 563 \times 120 \text{ Hz}/74.25 \text{ MHz}=4 \text{ lanes}$$

(4) Number of memories to be used: DDR1 (one of DDR2, DDR3 and DDR4 is possible)

(5) EPI bandwidth/lane: 50 MHz×24 UI (User Interface)=1.2 Gbps, 16 lanes

Driving conditions for the normal mode, the first power saving mode (½ Power Save) and the second power saving mode (¼ Power Save) when the rollable function is used will be described in comparison.

When the normal mode has switched to the first power saving mode (½ Power Save), the resolution of an image data signal input to the timing controller 120 may be reduced from 4400×2250 to 4400×1125 (i.e., ½). When the normal mode has switched to the second power saving mode (¼ Power Save), the resolution of an image data signal input to the timing controller 120 may be reduced from 4400×2250 to 4400×563 (i.e., ¼). That is, when driving conditions for the first saving mode are changed to driving modes for the second saving mode, the resolution of an image data signal input to the timing controller 120 can be further reduced.

When the normal mode has switched to the first power saving mode (½ Power Save), the number of lanes of the first interface V×1 connected between the image provider 110 and the timing controller 120 may be reduced from 16 lanes to 8 lanes (n/2 lanes). In addition, the normal mode has switched to the second power saving mode (¼ Power Save), the number of lanes of the first interface V×1 connected between the image provider 110 and the timing controller 120 may be reduced from 16 lanes to 4 lanes (n/4 lanes). That is, when driving conditions for the first saving mode to driving conditions for the second saving mode, the number of lanes (including reduction in data transmission traffic according to reduction in the number of data transmission lines) of the first interface V×1 connected between the image provider 110 and the timing controller 12 can be further reduced.

When the normal mode has switched to the first power saving mode (½ Power Save), the number of memories DDR1 to DDR4 operating in connection with the timing controller 120 may be reduced from four to two. In addition, when the normal mode has switched to the second power saving mode (¼ Power Save), the number of memories DDR1 to DDR4 operating in connection with the timing controller 120 may be reduced from four to one. That is, when driving conditions for the first saving mode to driving conditions for the second saving mode, the number of memories DDR1 to DDR4 used by the timing controller 120 can be further reduced.

When the normal mode has switched to the first power saving mode (½ Power Save), the number of lanes of the second interface EPI connected between the timing controller 120 and the data driver 140 can be reduced from 32 lanes to 16 lanes (n/2 lanes) (the bandwidth may not be changed or may be changed). When the normal mode has switched to the second power saving mode (¼ Power Save), the bandwidth and the number of lanes of the second interface EPI connected between the timing controller 120 and the data driver 140 can be reduced from 2.4 Gbps and 32 lanes to 1.2 Gbps and 16 lanes (n/2 Gbps and n/2 lanes). That is, when driving conditions for the first saving mode are changed to driving conditions for the second saving mode, the bandwidth and the number of lanes (at least one of the data transmission rate and the number of transmission lines) of the second interface EPI connected between the timing controller 120 and the data driver 140 can be further reduced.

As described above, when driving conditions for the normal mode are changed to driving modes for the power saving mode at the time of using the rollable function, driving environments (resolution and frequency) and interface environments of devices included in the image provider 110, the timing controller 120, and the data driver 140 can be lowered to reduce power consumption.

A power saving mode that can be implemented in a rollable display device such as the rollable television set 100 may be defined as many stages according to a degree of exposure of the display panel 150. Accordingly, it should be understood that a plurality of power saving modes is present when the rollable function is used. The effect of reducing power consumption according thereto can be further improved than those of the above-described examples.

Figure 22:
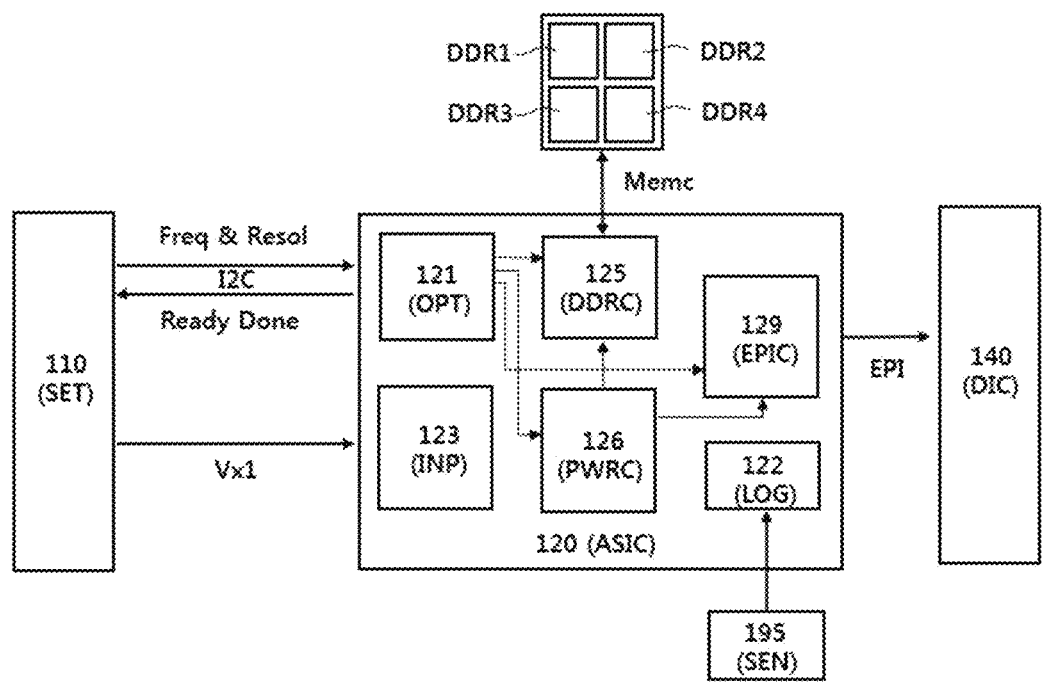
FIG. 22 is a diagram for describing a rolling sensor of the rollable television set according to a modified example of the fifth embodiment of the present invention.

FIG. 22 is a diagram for describing a rolling sensor of the rollable television set according to a modified example of the fifth embodiment of the present invention.

As illustrated in FIG. 17 and FIG. 22, a rolling sensor 195 may be included in order to change a device driving environment (resolution and frequency) and an interface environment according to a degree of exposure of the display panel 150 when the rollable function of the rollable television set 100 is used.

The rolling sensor 195 may be provided inside the housing 190, detect change in the position of a marker formed in the display panel 150 to generate a rolling sensing signal, and transmit the rolling sensing signal to a logic circuit 122 (LOG) of the timing controller 120. The logic circuit 122 (LOG) may determine a rolling state of the display panel 150 based on the rolling sensing signal and transmit the rolling state to the option controller 121.

The option controller 121 may add the current state (rolling state) of the display panel 150 to a ready done signal when transmitting the ready done signal to the image provider 110. The image provider 110 may control the device in power saving modes in various stages when the rollable function is sued. However, the above description is merely an example and the present invention is not limited thereto.

Figure 23:
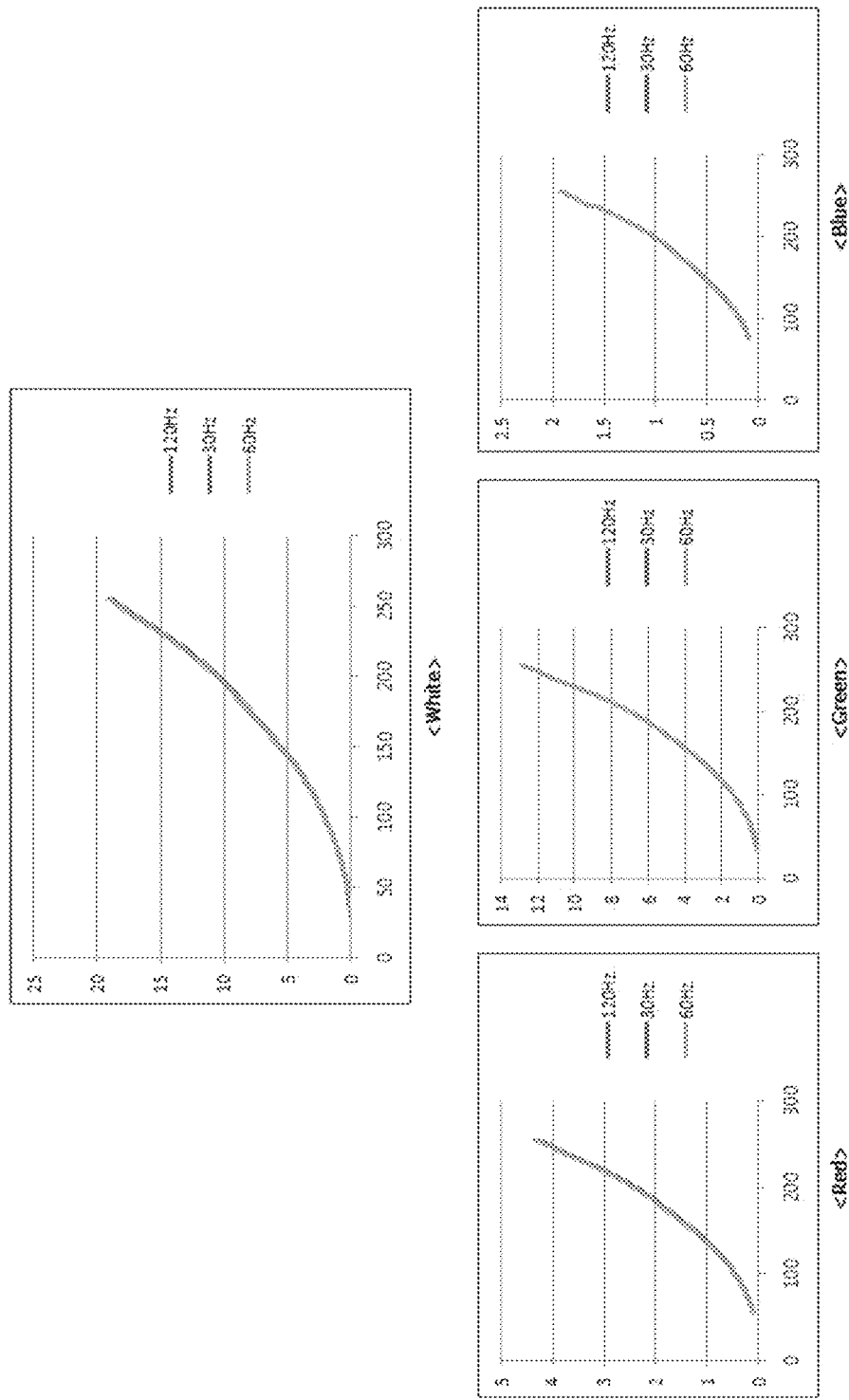
FIG. 23 shows simulation results obtained by testing the second embodiment after a display panel is realized based on an oxide transistor.

FIG. 23 shows simulation results obtained by testing the second embodiment after a display panel is realized based on an oxide transistor.

FIG. 23 shows simulation results obtained by realizing a display panel based on an oxide transistor (Oxide-TFT) and then evaluating the normal mode and the power saving mode of the AOD function in order to test the second embodiment.

As can be ascertained from the simulation results, the oxide transistor has a lower leakage current generation rate than other types of transistors, and thus there are little luminance differences (within an error range) even when a frequency is changed. Accordingly, the second embodiment of the present invention can realize the AOD function for reducing power consumption without affecting display quality.

As described above, the present invention can lower a device driving environment (frequency and the like) and an interface environment by changing driving conditions when a display area of a display panel is displayed in a specific size in a specific space (AOD), to reduce power consumption. Furthermore, the present invention can lower a device driving environment (resolution, frequency, and the like) and an interface environment by changing driving conditions according to a degree of exposure of the display area of the display panel (change in the display area when the rollable function is used) to reduce power consumption.

What is claimed is:

1. A display device, comprising:
   a display panel configured to display images;
   a data driver configured to supply data voltages to the display panel; and
   a controller configured to control the data driver; and
   a housing configured to control the display panel such that the display area of the display panel is exposed to the outside or accommodated in the housing,
   wherein the controller operates in a normal mode having normal driving conditions and a power saving mode having driving conditions for reducing power consumption and lowers a driving frequency and an environment of an interface connected to the data driver as compared to a driving frequency and an interface environment in the normal mode when operating in the power saving mode,
   wherein, when operating in the power saving mode, the controller decreases a resolution along with the driving frequency and a number of external memories to be used as compared to those in the normal mode according to a degree to which the display area of the display panel is exposed to the outside, and decreases a data transmission rate, the number of data transmission lines, and data transmission traffic in the environment of the interface connected to the data driver as compared to those in the normal mode.

2. The display device of claim 1, wherein the controller includes two or more external memories for storing image data signals and does not use some or all of the two or more external memories when operating in the power saving mode.

3. The display device of claim 1, wherein the controller includes:
   an option controller configured to perform prior preparation for changing the driving conditions by exchanging signals with at least one of internal circuits;
   an input controller configured to receive external image data signals;
   a memory controller configured to control read/write of external memories; and
   an interface controller configured to control an interface connected to an external device,
   wherein the controller does not use at least one of the input controller and the memory controller when operating in the power saving mode.

4. The display device of claim 3, wherein, when the display panel executes an always-on-display (AOD) function of always turning on a part of the display area in order to display a predetermined image in a predetermined size in a predetermined space, the controller decreases the driving frequency, the number of external memories to be used, the data transmission rate, and the number of data transmission lines in the environment of the interface connected to the data driver as compared to those in the normal mode in the power saving mode.

5. The display device of claim 4, wherein the controller further includes a picture quality controller configured to perform picture quality processing for enhancing display quality on the image data signals, and
   wherein the controller does not use the picture quality controller in the power saving mode.

6. The display device of claim 1, wherein the controller switches an environment of an interface connected between the image provider and the controller from a first communication interface to a second communication interface and supplies the data signals through the second communication interface when operating in the power saving mode.

7. The display device of claim 1, wherein the controller further includes a pattern generator configured to generate image patterns to be displayed on the display panel when operating in the power saving mode,
   wherein the interface connected between the image provider and the controller is not used when at least one of the image patterns is displayed on the display panel.

8. A display device comprising:
   a display panel configured to display images;
   a data driver configured to supply data voltages to the display panel;
   a controller configured to control the data driver;
   an image provider configured to provide data signals to the controller; and
   a housing configured to control the display panel such that the display area of the display panel is exposed to the outside or accommodated in the housing,
   wherein the controller operates in a normal mode having normal driving conditions and a power saving mode having driving conditions for reducing power consumption and lowers a driving frequency and an environment of an interface connected to the data driver as compared to a driving frequency and an interface environment in the normal mode when operating in the power saving mode, and
   wherein, when operating in the power saving mode, the image provider decreases a resolution as compared to that in the normal mode according to a degree to which the display area of the display panel is exposed to the outside, and decreases the number of data transmission lines in the environment of the interface connected to the controller as compared to that in the normal mode.

9. The display device of claim 8, wherein the image provider decreases the resolution and the number of data transmission lines to half the resolution and the number of data transmission lines in the normal mode when about half the display area of the display panel is exposed to the outside of the housing.

10. The display device of claim 8, wherein the image provider decreases the resolution and the number of data transmission lines to a quarter of the resolution and the number of data transmission lines in the normal mode when about a quarter of the display area of the display panel is exposed to the outside of the housing.

11. A method for driving a display device including a display panel configured to display images, a data driver configured to supply data voltages to the display panel, and a controller configured to control the data driver, the method comprising:

driving the device in a normal mode having normal driving conditions; and driving the device in a power saving mode having driving conditions for reducing power consumption, wherein the driving of the device in the power saving mode comprises lowering a driving frequency and an environment of an interface connected between the controller and the data driver as compared to a driving frequency and an interface environment in the normal mode, wherein the power saving mode includes a rollable operation of controlling the display panel such that the display area of the display panel is exposed to the outside of a housing or accommodated in the housing, and wherein the driving frequency, a number of external memories to be used, and a resolution are decreased as compared to those in the normal mode according to a degree to which the display area of the display panel is exposed to the outside, and a transmission rate, the number of data transmission lines, and data transmission traffic in the environment of the interface connected to the data driver are decreased as compared to those in the normal mode in the rollable operation.

12. The method of claim 11, wherein the driving of the device in the power saving mode comprises not using some or all of the external memories operating in connection with the controller.

13. The method of claim 11, wherein the driving of the device in the power saving mode comprises:

decreasing at least one of the driving frequency, the resolution, and the number of external memories to be used as compared to those in the normal mode; and decreasing at least one of the data transmission rate, the number of data transmission lines, and the data transmission traffic in the environment of the interface connected between the controller and the data driver as compared to those in the normal mode.

14. The method of claim 11, wherein the power saving mode includes an always-on-display (AOD) operation in which the display panel always turns on a part of a display area in order to display a predetermined image in a predetermined size in a predetermined space, and wherein the driving frequency, the number of external memories to be used, and the data transmission rate and the number of data transmission lines in the environment of the interface connected to the data driver are decreased as compared to those in the normal mode in the AOD operation.

* * * * *